Jan. 31, 1956  A. P. DOUGLAS  2,732,728
BICYCLE TRANSMISSION SHIPPER OPERATING MECHANISM
Filed Nov. 30, 1953  2 Sheets-Sheet 1
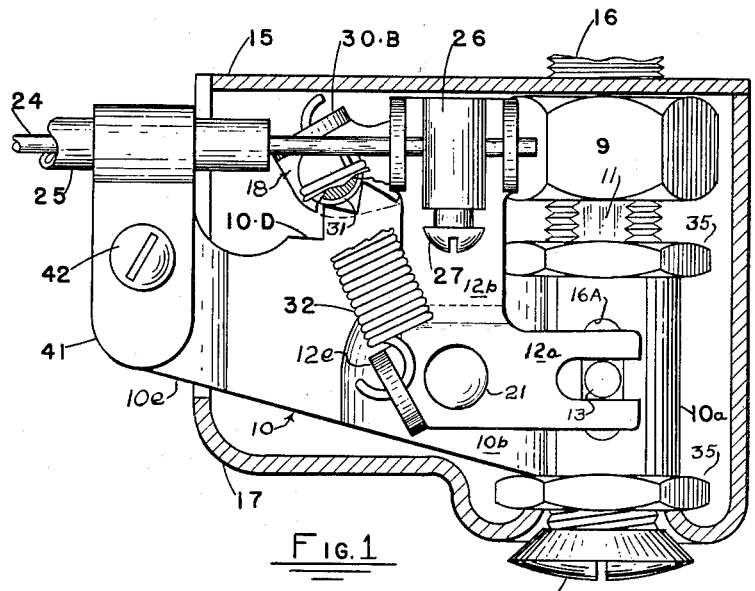
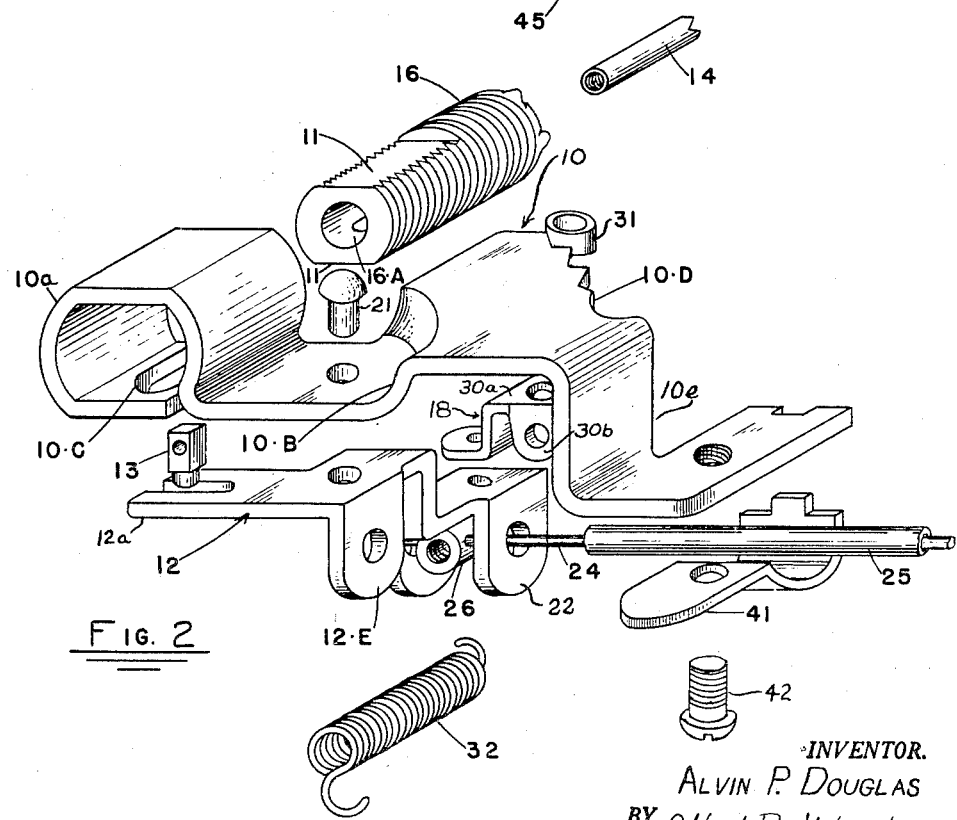
INVENTOR.
ALVIN P. DOUGLAS
BY Albert R. Gobrick Jan. 31, 1956  A. P. DOUGLAS  2,732,728
BICYCLE TRANSMISSION SHIPPER OPERATING MECHANISM
Filed Nov. 30, 1953  2 Sheets-Sheet 2

INVENTOR.
ALVIN P. DOUGLAS
BY Albert R. Golrick

United States Patent Office 2,732,728
Patented Jan. 31, 1956

2,732,728

BICYCLE TRANSMISSION SHIPPER OPERATING MECHANISM

Alvin P. Douglas, Cleveland, Ohio, assignor to The Murray Ohio Manufacturing Company, Cleveland, Ohio, a corporation of Ohio Application November 30, 1953, Serial No. 394,953

15 Claims. (Cl. 74—473)

This invention relates to a bicycle change speed mechanism and more particularly to three speed planetary types of transmissions.

It is an object of the present invention to provide a selective transmission shipper operating means so devised that the elements thereof may be constructed and produced in the form of sheet metal stampings.

The selections of gear couplings for speed changes are usually accomplished in bicycle transmissions by the use of an axially extending rod or bar which is connected to a shiftable gear or clutch element at the inner end while the outer end protrudes at the axle end outside of the rear frame structure of the bicycle. A shipper bar or rod terminates adjacent the mentioned outer terminus of the axle. Usually a flexible push and pull rod extends from the handle bar region of the bicycle to the shipper operating means comprising chain links for shifting in one direction and a compression spring to effect shifting in the opposite direction. In the present disclosure the shifting is effected positively in both directions.

It is another purpose of this invention to provide an arrangement of stamped parts which when assembled will be compact but sufficiently rugged to withstand inadvertent shocks incident to the use of a bicycle.

A still further purpose is the provision of a shipper operating mechanism of the construction referred to which can be readily mounted upon and be supported by the bicycle rear axle while serving to shift a transmission in either direction to any one of three selected positions.

A further object is the provision of a housing mounting which may readily be mounted on the axle and frame to protect the operating parts of the shipper operating mechanism but which can be opened to afford access to the shipper mechanism for servicing purposes.

Other objects of the invention will become apparent from the following description of an embodiment thereof as shown in the drawings. The essential characteristics thereof are summarized in the claims.

In the drawings:

Fig. 1 is a plan view of the device embodying my invention as viewed from the underside;

Fig. 2 is an exploded view of the elements of the device shown in Fig. 1;

Figure 3:
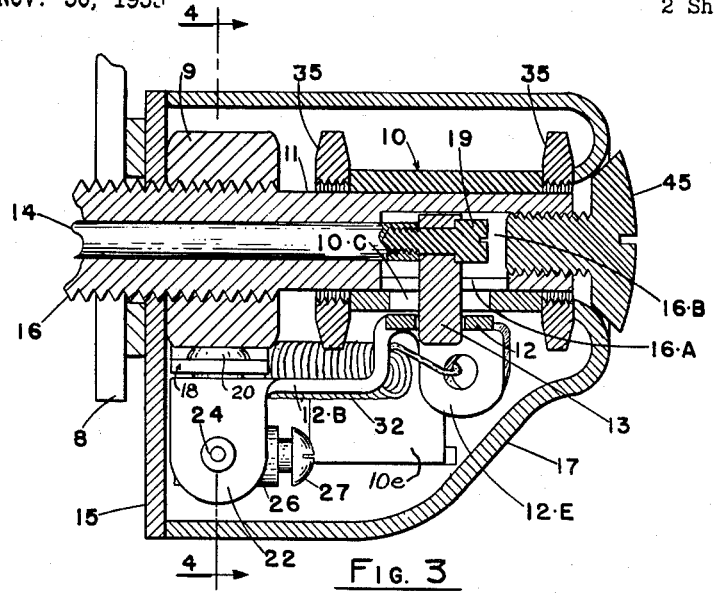
Fig. 3 is a cross sectional vertical elevation taken through a vertical plane passing through the axle center.

The particular shipper mechanism disclosed is adapted to positively shift a shipper rod into three positions whereby the shipper rod at its inner end (not shown) serves to position the elements of a transmission mechanism for a low speed setting, a high speed setting and a direct drive setting. In the instant application the use of a planetary gear means is contemplated and the order of transmission setting movement from a completely outward position to a completely inward position is a low speed setting, a direct drive setting and a high speed setting respectively. A detent means is provided to maintain the shipper rod and the transmission elements attached thereto in any one of the selected positions and it is one of the purposes of the present invention to avoid dependence upon any spring means to effect shifting movements of the transmission elements.

Referring to the drawings I show a main bracket 10 which is so formed as to constitute a support for a bifurcated shipper lever 12 which is pivotally supported on the underside of the bracket by a stud or stud pin 21. The bifurcated end 12a of the shipper lever engages a shipper rod 14 disposed in a central bore formed in the bicycle axle 16 in a manner to be described. The shipper lever carries a detent lever 18 pivotally supported thereon at 20 and also has a stirrup formation 22 on an arm 12b thereof which constitutes a connection for a flexible push and pull rod 24 disposed in a plastic tube 25 as will be described.

It will be noted, particularly in Fig. 3 that the bicycle axle 16 has flat lands 11 formed at the top and underside on the axle portion which extends outwardly beyond the axle locking nut 9. The nut serves the usual purpose of clamping the axle 16 to the rear fork clip 8 but also serves to secure a side wall 15 of a two piece housing structure for the shipper operating mechanism firmly to the axle and bicycle frame. No part of this mechanism is operatively supported by the housing structure but is thereby enclosed completely.

The supporting bracket 10 is attached to the flat landed portion of the axle structure by having a hub portion 10a conforming in shape to the flattened portion of the axle and two adjustable nuts 35 engage the hub ends of the bracket structure to secure the bracket and the supported shipper lever in an adjusted position relative to the shipper rod stud member 13. As shown in Fig. 3, the stud member 13 extends through an axially extending slot 16a which communicates with an enlarged bore 16b of the axle and is secured to the outer end of the shipper rod 14 by a screw member 19, the slot 16a serving as a slideway for the shipper stud 13. It will be noted that the hub portion 10a of the bracket structure has an axially extending aperture 10c located to be co-incident with the axle slot 16a so that the shipper stud 13 may extend downwardly with the outer end thereof disposed to be engageable by the bifurcated end 12a of the shipper lever 12.

The shipper lever 12 is generally L-shaped to be in the form of a bell crank and is mounted on the under side of the bracket structure 10 and the bracket has a depressed portion 10b (see Fig. 2) which supports the lever pivot pin 21 so that the bifurcated end of the lever embraces this shipper rod stud 13. The stirrup formation 22 of the arm 12b of the lever has openings through which passes the end of the push and pull rod 24. A barrel shaped adjusting nut 26 disposed between the legs of the stirrup formation has a diametrical opening through which the push and pull rod passes and a clamping screw 27 binds the member 26 and rod 24 together.

The shipper lever 12 has pivotally mounted thereon immediately above the stirrup formation 22, a detent lever 18 in the form of a link swinging about a stud 20 secured to the lever 12. The link 18 carries a detent roller 31 on an upset part 30a of the link, the upset being sufficient to dispose the roller 31 to ride upon a notched edge 10d of the bracket 10. A helical spring 32 is connected with an eyeleted lug 30b of the link and with an eyeleted lug 12e formed on the lever 12 adjacent the pivotal mounting 20 of the link, the location of the two spring eyelets relative to the link pivotal mounting being such that the link and roller are biased in movement toward the detent formations 10d of the bracket which define the three aforementioned selective positions of the shipper rod 14.

Figure 4:
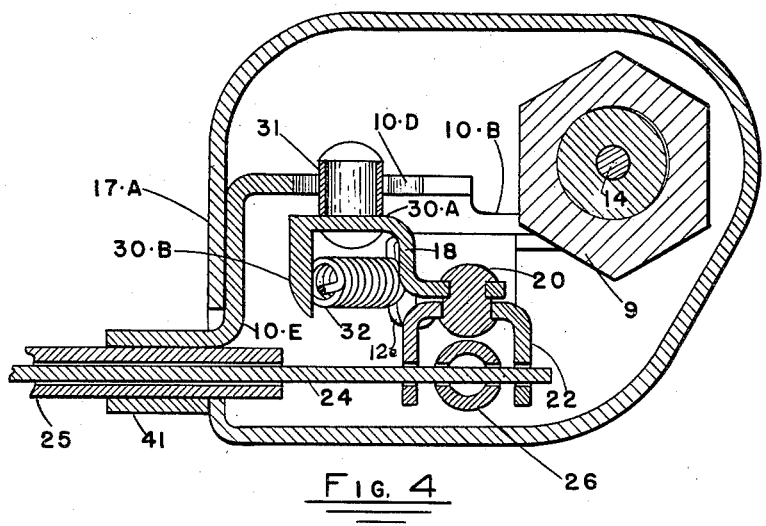
Fig. 4 is a cross sectional view taken substantially along the line 4—4 of Fig. 3.

It will be noted in Fig. 4 that the bracket structure 12 has a forwardly extending portion 10e in the form of a depending L-shaped leg which serves as a terminal anchor for the rear end of the push and pull rod tube 25. A tube clamping member 41 in notched engagement with the bracket part 10e is held in clamped relation to the tube and bracket by a screw member 42 to such extent as not to interfere with the movement of the push and pull rod. This L-shaped part 10e of the bracket also serves as an abutting wall for the housing structure as will be seen in Fig. 4.

As stated the housing structure comprises two members, a base or inner side wall member 15 and a comparatively deep drawn member 17 contoured to enclose the shipper operating means as shown in Figs. 3 and 4. A notched engagement between the members 15 and 17 stabilizes the inner assembled relationship of the two members, and the outer end of the housing member 17 has an inwardly flanged opening through which a clamping screw member 45 extends to engage the internally threaded end of the axle. The forward wall 17a of the housing rests upon portion 10e of the bracket structure. Thus in assembling the rear axle, the member 15 and associated spacer washer are clamped to the bicycle rear for structure by the nut 9 and adjustment of the mechanism is then made.

Adjustment of the mechanism is effected by the nut members 35 and the push and pull rod barrel nut 26 and screw 27 relative to the shipper rod 14 and the three axially selective positions of the transmission elements. The nuts 35 and screw 27 are then tightened and thereafter the detent formations 10d on the bracket, the spring 32 and link roller 31 define the selective positions of the shipper rod.

Operation of the mechanism is as follows: The detent and shipper levers 18 and 12 respectively are shown by Figs. 1 and 3 in the middle or direct drive position, the roller 31 on the detent lever being held in that position by the influence of the spring 32. When the shipper lever is rocked in either direction by the push and pull rod 24, the detent lever is yieldingly rocked— since it is carried on the shipper lever—as the roller 31 surmounts one of the crests of the detents 10d on the bracket thereby extending spring 32, and the force of the spring then will have some shifting action on the shipper lever radial member 13 and shipper rod 14 until the roller 31 has dropped into a notch. Thus the shipper rod 14 is operated positively in both an inward and an outward direction when the push and pull rod is operated by the bicycle rider. Axial adjustment of the bracket 10 by the lock nuts 35 will effect adjustment of the shipper rod 14 for proper transmission gear alignment and since the detent spurs 10d are part of the bracket the detents will always define the three desired shipper rod positions.

To those skilled in the art it will be noted that the levers, housing and supporting bracket are all so designed as to be shaped readily by sheet metal stamping and forming and thus permitting of the attainment of economic production. The push and pull rod and its tubular housing are operatively disposed immediately adjacent the frame structure of the bicycle and all laterally extending parts including the axle extension are completely enclosed within a housing which may be rugged in construction to withstand considerable abuse. The bracket construction while serving several functions affords the use of a detent means which may be of sufficient size and strength to urge the lever and rod to a selected position once the roller has been swung past the crest of the detent notch, thus indicating to the rider a completion of a desired shifting movement.

I claim:

1. A change speed shipper operating mechanism for a bicycle transmission comprising a bracket member, a rear bicycle axle having a centrally bored end, a speed change shipper rod disposed within the bore of the axle to terminate short of the axle end, said bracket member being shaped to fit on the bored end of the axle, means securing the bracket to the axle, a shipper rod operating lever pivotally supported on the bracket, and radially extending means supported by the axle and connecting the lever and shipper rod.

2. A change speed shipper operating mechanism for a bicycle transmission comprising a bracket member, a rear bicycle axle having a centrally bored end, a speed change shipper rod disposed within the bore of the axle, said bracket member being shaped to fit on the bored end portion of the axle, means adjustably securing the bracket to the axle whereby the bracket may be adjusted axially of the axle, a shipper rod operating lever pivotally supported on the bracket and adapted to be connected to a push and pull rod, and radially extending means supported by the axle and connecting the lever and shipper rod.

3. A change speed shipper operating mechanism for a bicycle transmission comprising a bracket member, a rear bicycle axle having a centrally bored end, a speed change shipper rod disposed within the bore of the axle, said bracket member being shaped to fit on the bored end of the axle, means adjustably securing the bracket to the axle whereby the bracket may be adjusted axially of the axle, a shipper rod operating lever pivotally supported on the bracket and adapted to be conencted to a push and pull rod, means connecting the lever and shipper rod, and a detent means acting between the bracket and the lever for pre-determining the shifted position of the shipper rod through the lever.

4. A change speed shipper operating mechanism for a bicycle transmission comprising a bracket member, a rear bicycle axle having flat lands formed on a centrally bored end thereof, a speed change shipper rod disposed within the bore of the axle, said bracket member being shaped to fit on the landed end of the axle, means adjustably securing the bracket to the axle whereby the bracket may be adjusted axially of the axle, a shipper rod operating lever pivotally supported on the bracket, and adapted to be connected to a push and pull rod, means connecting the lever and shipper rod, and a resiliently urged detent means acting between the bracket and the lever for pre-determining the shifted position of the shipper rod through the lever.

5. A shipper operating mechanism for a three speed bicycle transmission comprising in combination, a rear axle, a shipper rod extending axially of the axle, a bracket member fixed to the axle, a lever member pivotally supported by the bracket, radially extending means supported by the axle and operatively connecting the lever to the rod and a housing structure enclosing the lever and bracket, said housing comprising a member adapted to be clamped to the rear fork structure of a bicycle frame and a member clamped to the end of the axle.

6. A shipper operating mechanism for a three speed bicycle transmission comprising in combination, a rear axle having a central bore at one end, a shipper rod extending in said bore axially of the axle, a bracket member fixed to the axle, a lever member pivotally supported by the bracket, and radially extending means through the axle wall and bracket for operatively connecting the lever to the rod.

7. A shipper operating mechanism for a three speed bicycle transmission comprising in combination, a rear axle having a central bore at one end, a shipper rod extending axially of the axle in said bore, a bracket member fixed to the axle, said axle and bracket having coinciding axially extending openings therein, a lever member pivotally supported by the bracket, and radially disposed means extending through said openings and operatively connecting the lever to the rod.

8. A shipper operating mechanism for a three speed bicycle transmission comprising in combination, a centrally bored rear axle, a shipper rod extending in said bore axially of the axle, a bracket member fixed to the axle, a lever member pivotally supported by the bracket, radially extending means operatively connecting the lever to the rod, and a housing structure enclosing the lever and bracket, said housing comprising a member adapted to be clamped to the rear fork structure of a bicycle frame independently of the fixed bracket and a member clamped to the bored end of the axle in a stabilized relation to the structure of the bracket.

9. A shipper operating mechanism for a three speed bicycle transmission comprising in combination with the shipper element of the transmission of a rear axle, a lever member operatively connected to the shipper element, a bracket member on the axle supporting the lever and adjustably mounted on the axle thereby to adjust the shipper rod through the lever to selective transmission positions, and a housing structure enclosing the bracket and lever supported by the bracket and the axle.

10. A shipper operating mechanism for a three speed bicycle transmission comprising in combination with the shipper element of a transmission of a rear axle, a lever member operatively connected to the shipper element, a bracket member on the axle and extending forwardly of the axle to support the lever, and a housing structure enclosing the bracket and lever and supported by the bracket and the axle.

11. A shipper operating mechanism for a three speed bicycle transmission comprising in combination with the shipper element of the transmission of a rear axle, a lever member operatively connected to the shipper element, a bracket member on the axle supporting the lever, means on the bracket for supporting a push and pull rod device adapted to operate the lever, and a housing structure enclosing the bracket and lever and supported by the bracket and the axle with said device disposed exteriorly of the housing.

12. A shipper operating mechanism for a three speed bicycle transmission comprising in combination with the shipper element of the transmission of a rear axle, a lever member operatively connected to the shipper element, a bracket member on the axle supporting the lever and mounted on the axle, and a two piece housing structure enclosing the bracket and lever with one member supported by the axle and the other member supported by the axle end and the other member.

13. A shipper operating mechanism for a bicycle transmission comprising, an axle member having a central bore extending from an end thereof inwardly to the wheel hub supporting region of the axle, a transmission shipper rod disposed in said bore for axial movement therein, said axle having a slotted opening formed to extend diametrically inwardly to the end bore of the axle and said opening being formed to extend in an axial direction between the said end of the axle and the bicycle frame supporting part of the axle, a bracket member fixed on the axle thereby to surround the slotted part of the axle, said surrounding part of the bracket having an axially extending opening coincident with the axle opening, a lever member supported by the bracket structure, and a radially extending member disposed in said slotted openings and serving as an operative connection between the lever and said rod.

14. In a shipper operating mechanism of the character described, a bicycle axle member having an end adapted to extend outwardly beyond the frame clamping nut of the axle assembly, a bracket fixed to the axle extension, a shipper rod within the axle, a lever supported by the bracket and a connecting means between the lever and the rod, said connecting means extending through an opening formed in the axle wall and in the bracket.

15. A shipper operating mechanism for a bicycle transmission comprising, an axle member having a passageway extending inwardly from an end of the axle, a transmission shipper rod disposed in said passageway, a sheet metal bracket member having a hub formation surrounding the said end portion of the axle, a lever member pivotally supported on a horizontal portion of the bracket extending from the bracket hub formation, means fixing the bracket to the axle, means connecting one end of the lever to the shipper rod, said horizontal portion of the bracket having a star indent shape defining three positions of the lever and shipper rod, a roller carrying lever member pivotally mounted on the lever, a roller on the last named lever and disposed to ride upon the indent formation of the bracket and spring means connected to the first lever bracket and to the roller carrying lever, the connection being so disposed that the lever roller will be caused to act upon said bracket indent formation thereby to define the selected positions of the shipper rod through its actuating lever.

References Cited in the file of this patent
UNITED STATES PATENTS

| | | |
|---|---|---|
| 863,422 | Newton | Aug. 13, 1907 |
| 2,560,154 | Brown | July 10, 1951 |